(12) United States Patent
Shigetaka et al.

(10) Patent No.: US 7,202,855 B2
(45) Date of Patent: Apr. 10, 2007

(54) CAPACITIVE INPUT DEVICE

(75) Inventors: Hiroshi Shigetaka, Fukushima-ken (JP); Ryuichi Hagiya, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 470 days.

(21) Appl. No.: 10/246,177

(22) Filed: Sep. 18, 2002

(65) Prior Publication Data
US 2003/0052867 A1  Mar. 20, 2003

(30) Foreign Application Priority Data
Sep. 20, 2001  (JP) ............................. 2001-286131

(51) Int. Cl.
*G09G 5/00* (2006.01)
(52) U.S. Cl. ............... 345/173; 178/180.06; 178/18.01
(58) Field of Classification Search ................ 345/173, 345/174, 179; 178/18.01–18.03, 18.06
See application file for complete search history.

(56) References Cited

U.S. PATENT DOCUMENTS

| 4,677,259 | A | * | 6/1987 | Abe | 178/18.03 |
| 5,159,159 | A | * | 10/1992 | Asher | 178/18.05 |
| 5,521,336 | A | * | 5/1996 | Buchanan et al. | 178/18.03 |
| 5,869,790 | A | | 2/1999 | Shigetaka et al. | |
| 5,869,791 | A | * | 2/1999 | Young | 178/18.03 |
| 5,896,127 | A | | 4/1999 | Matsufusa et al. | |
| 6,093,477 | A | * | 7/2000 | Matsufusa et al. | 345/173 |
| 6,304,251 | B1 | * | 10/2001 | Ito et al. | 345/173 |
| 6,380,497 | B1 | * | 4/2002 | Hashimoto et al. | 345/173 |
| 6,859,062 | B2 | * | 2/2005 | Fujii et al. | 324/770 |
| 2002/0171634 | A1 | * | 11/2002 | Matsufusa | 345/173 |

* cited by examiner

*Primary Examiner*—Kent Chang
(74) *Attorney, Agent, or Firm*—Brinks Hofer Gilson & Lione

(57) ABSTRACT

An X electrode layer having X electrodes and a Y electrode layer having Y electrodes are formed on one side of a film board through an insulating film so that the X electrodes and the Y electrodes are arranged into a matrix. Ends of the X electrodes are led to the edge of the film board. The Y electrodes are led through through-holes formed in the insulating film to the edge of the film board in the same plane as the X electrode layer. The X and Y electrodes led to the edge of the film board are connected to a conductor portion formed on a control circuit board. The X and Y electrodes are bonded to the conductor portion by an insulating adhesive containing no conductive particles by heating and pressurization.

31 Claims, 8 Drawing Sheets

CAPACITIVE INPUT DEVICE

BACKGROUND OF THE INVENTION

1. Field of the Invention

The present invention relates to a capacitive input device used as, for example, a pointing device for a personal computer.

2. Description of the Related Art

FIG. 11 is a schematic cross-sectional view of an input device 100 in the related art. The input device 100 is a pad-type pointing device for use in notebook-type personal computers.

In the input device 100 shown in FIG. 11, an X electrode layer 103 having a plurality of X electrodes 102 is formed on the upper surface of a synthetic resin film board (sensor board) 101, and a Y electrode layer 105 having a plurality of Y electrodes 104 is formed on the lower surface of the film board 101, such that the X electrodes 102 and the Y electrodes 104 are arranged into a matrix. The X electrode layer 103 and the Y electrode layer 105 are covered with insulating films 106 and 107, respectively. A top sheet 108 is provided above the X electrode layer 103 serving as a sensing surface. The electrode layers 103 and 105, the insulating films 106 and 107, and the top sheet 108 are rectangular with the same dimension.

The input device 100 further includes a control circuit board 110 on the bottom layer opposite to the top sheet 108. The control circuit board 110 is also rectangular with the same dimension as the film board 101. A control circuit 111 is formed on a surface of the control circuit board 110 that is farthest from the film board 101.

In the input device 100, through-holes (not shown) are formed in the film board 101, the insulating film 107, and the control circuit board 110. This allows the X electrode layer 103 and the Y electrode layer 105 to be electrically connected with each other so that a signal in response to capacitance detected between the X electrode layer 103 and the Y electrode layer 105 is passed to the control circuit 111.

However, the electrode layers 103 and 105, and the film board 101 overlie the control circuit board 110, thus making the related art input device 100 thick. A notebook-type personal computer (PC) incorporating such a thick input device 100 cannot be thin. Moreover, the control circuit board 110 has the same size and area as the film board 101, leading to increased cost.

SUMMARY OF THE INVENTION

In order to solve the above-described problems, it is an object of the present invention to provide a thin and low-cost input device.

The present invention provides an input device. The input device includes a sensor board, an X electrode layer having electrodes, a Y electrode layer having electrodes, and an insulating film disposed between the X and Y electrode layers. The X electrode layer and the Y electrode layer are disposed proximate to each other and on one surface of the sensor board.

In the above input device, through-holes may be formed in the insulating film. Ends of the electrodes in one of the X electrode layer and the Y electrode layer may be led through the through-holes onto the same plane as ends of the electrodes in the other layer, and the ends of the electrodes in the X and Y electrode layers may oppose and be directly connected to a conductor portion on a control circuit board.

According to the present invention, there is no need to dispose a control circuit board beneath the sensor board, thus making the input device thin. The control circuit board can be compact, thus reducing cost.

Preferably, the through-holes are formed so as to correspond to portions of the X electrode layer or the Y electrode layer. Thus, an extending portion of the sensor board, in which one electrode layer is led to the same plane as the other electrode layer, can be reduced.

A dummy electrode may be formed between adjacent electrodes in the X electrode layer so as to be parallel to the X electrode layer, and a dummy electrode may be formed between adjacent electrodes in the Y electrode layer so as to be parallel to the Y electrode layer.

The sensor board may comprise a film board, thus making the input device thin.

Preferably, the sensor board and the control circuit board are bonded to each other by a heated, pressurized thermosetting adhesive such that the ends of the electrodes in the X and Y electrode layers on the sensor board contact the conductor portion on the control circuit board.

A hole may be formed in the conductor portion so as to pass through the control circuit board, the hole being connected to the conductor portion. The adhesive may substantially fill the hole, thus, increasing the bonding intensity. Substantially no adhesive may be present between the ends of the electrodes in the X and Y electrode layers on the sensor board and the conductor portion on the control circuit board.

The sensor board and the insulating film may have extending portions that project in a direction of the plane of the sensor board and the insulating film, respectively. The extending portion of the sensor board may extend further than and overlap the extending portion of the insulating film. Ends of the electrodes in the X and Y electrode layers may be disposed on the same plane of the extending portion of the sensor board.

A second insulating film may oppose the first insulating film with one of the X and Y electrode layers disposed therebetween. A top sheet that is contactable by the user may be disposed on the sensor board.

The connector portion may comprise a planar array of land portions separated by gaps with adhesive disposed in the gaps.

In another embodiment, the input device comprises a sensor board, X and Y electrode layers each having electrodes, the X electrode and Y electrode layers disposed proximate to each other, and an insulating film disposed between the X and Y electrode layers. Ends of the electrodes in the X and Y electrode layers are disposed on the same plane of the sensor board.

The sensor board and the insulating film may have extending portions that project in a direction of the plane of the sensor board and the insulating film, respectively, the extending portion of the sensor board extending further than and overlapping the extending portion of the insulating film, the ends of the electrodes in the X and Y electrode layers disposed on the extending portion of the sensor board.

The input device may further comprise a control circuit board having a conductor portion, the ends of the electrodes in the X and Y electrode layers oppose and directly connected to the conductor portion. Through-holes may be formed in the insulating film, the ends of the electrodes in one of the X electrode layer and the Y electrode layer led through the through-holes onto the extending portion of the sensor board. The through-holes may correspond to portions of one of the X electrode layer and the Y electrode layer.

The sensor board and the control circuit board may be bonded to each other by an adhesive. Substantially no adhesive may be present between the ends of the electrodes in the X and Y electrode layers on the sensor board and the conductor portion on the control circuit board. A hole may be formed in the conductor portion that passes through the control circuit board with the hole connected to the conductor portion and the adhesive substantially filling the hole. The connector portion may comprise a planar array of land portions separated by gaps and the adhesive disposed in the gaps.

A first and second dummy electrode may be formed between adjacent electrodes in the X and Y electrode layers, respectively, such that the first and second dummy electrodes are parallel to the adjacent electrodes in the X and Y electrode layers, respectively. A top sheet may be disposed on the sensor board that is contactable by a user. The entirety of the X and Y electrode layers may be disposed on the same side of the sensor board.

In another embodiment, a method of decreasing a thickness of a capacitive input device comprises separating X and Y electrode layers by an insulating film such that the X and Y electrode layers are disposed proximate to each other and combining ends of electrodes in the X and Y electrode layers on the same plane of a sensor board.

The method may further comprise extending a portion of the sensor board and the insulating film in parallel directions, the extending portion of the sensor board extending further than the extending portion of the insulating film and combining the ends of the electrodes in the X and Y electrode layers on the extending portion of the sensor board.

The method may further comprise directly connecting a conductor portion of a control circuit board to the ends of the electrodes in the X and Y electrode layers.

The method may further comprise guiding the ends of the electrodes in one of the X electrode layer and the Y electrode layer through through-holes to merge the ends of electrodes in the X and Y electrode layers on the same plane of the sensor board.

The method may further comprise bonding the sensor board and the control circuit board by an adhesive and substantially eliminating adhesive from between the ends of the electrodes in the X and Y electrode layers on the sensor board and the conductor portion on the control circuit board.

The method may further comprise substantially filling a hole formed in the conductor portion, and that passes through the control circuit board, with the adhesive.

The method may further comprise heating and pressurizing thermosetting adhesive to bond the sensor board and the control circuit board to each other.

The method may further comprise bonding the sensor board and the control circuit board using adhesive disposed in gaps separating a planar array of land portions that form the connector portion.

The method may further comprise decreasing adverse effects of external environmental problems by forming dummy electrodes between adjacent electrodes in the X and Y electrode layers, respectively, that are parallel to the adjacent electrodes in the X and Y electrode layers.

The method may further comprise placing a top sheet on the sensor board such that when the top sheet is contacted by a user, a variation in capacitance between the electrodes in the X and Y electrode layers is detectable.

Therefore, an input device according to the present invention can be thinner than an input device in the related art, thus allowing a notebook computer incorporating the input device according to the present invention to be thinner. Furthermore, a control circuit substrate according to the present invention can be more compact than a control circuit substrate in the related art, and does not require multilayer substrate such as a four-layer substrate, thus achieving cost reduction.

DESCRIPTION OF THE PREFERRED EMBODIMENTS

Figure 1:
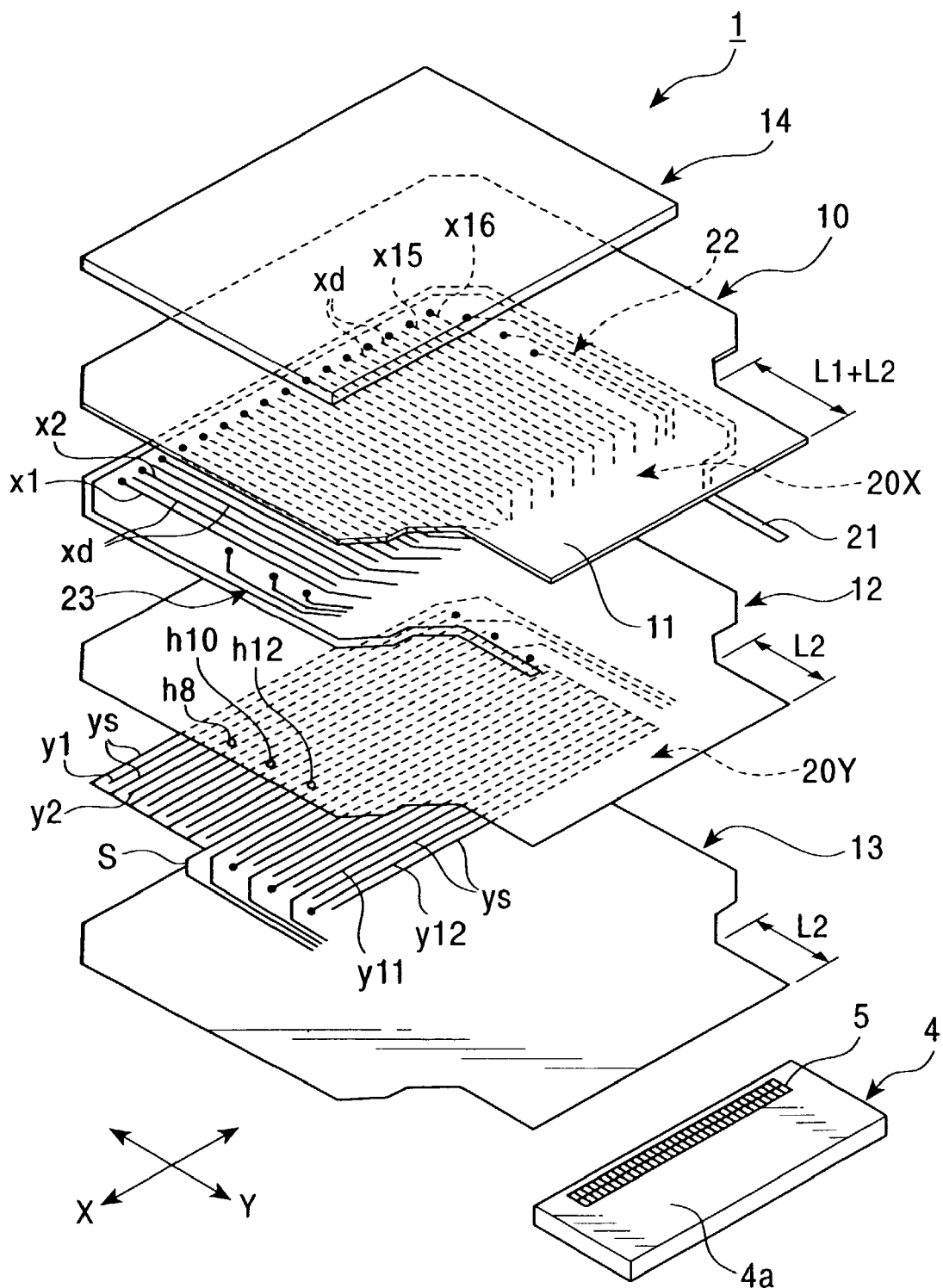
FIG. 1 is an exploded perspective view of an input device according to the present invention.
Figure 2:
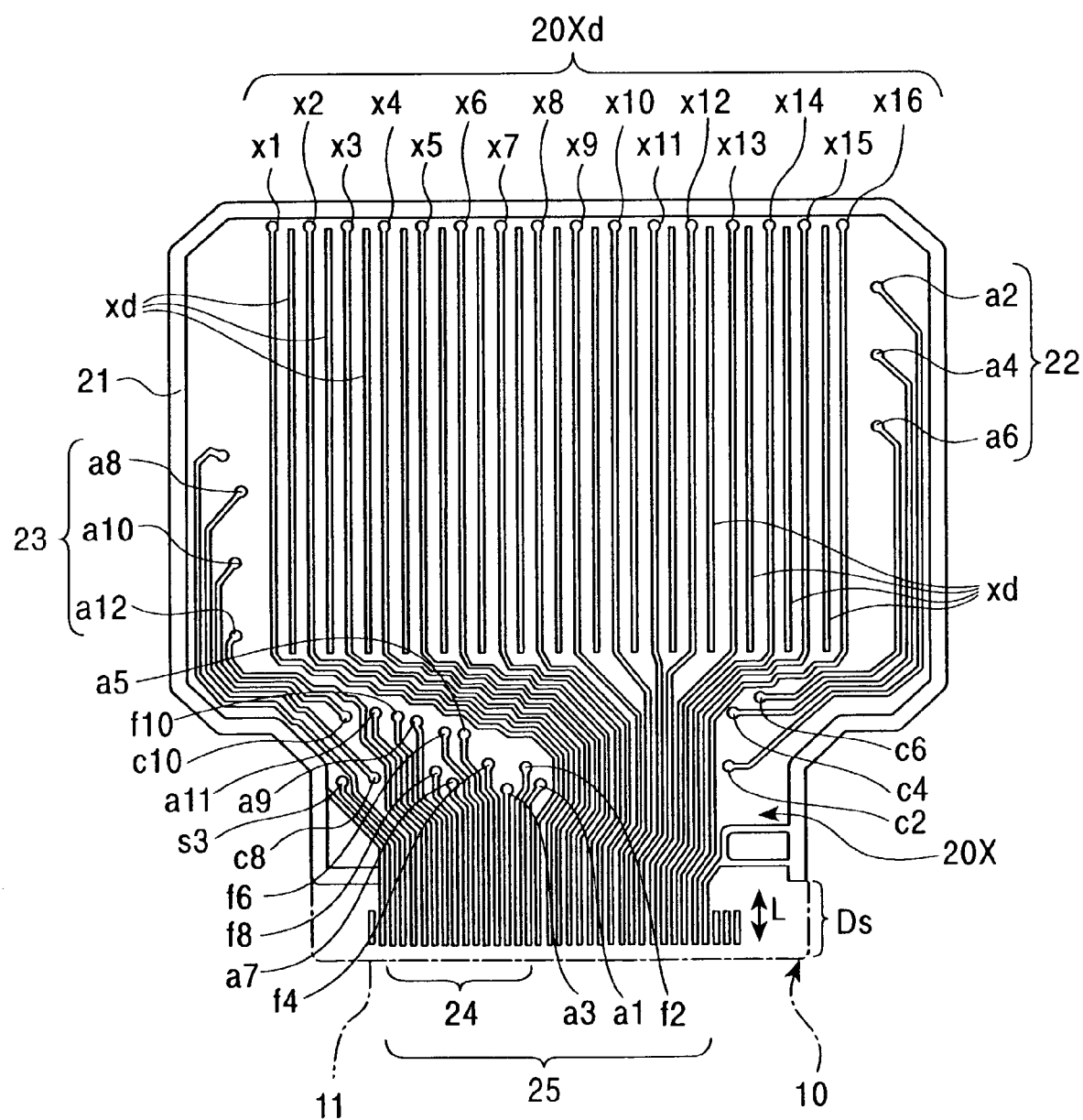
FIG. 2 is a circuit diagram of an X electrode layer.
Figure 3:
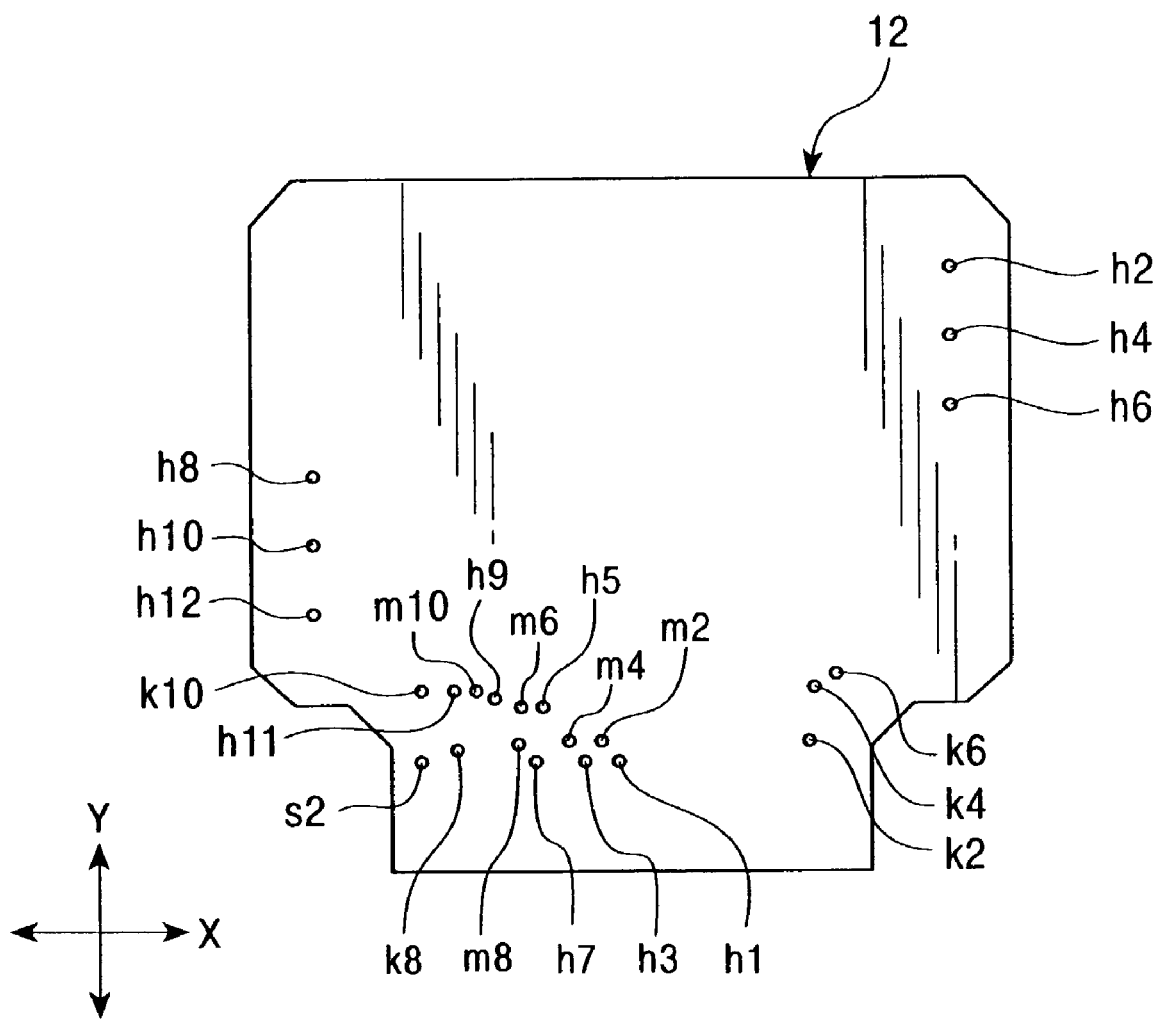
FIG. 3 is a plan view of through-holes formed in an insulating film.
Figure 4:
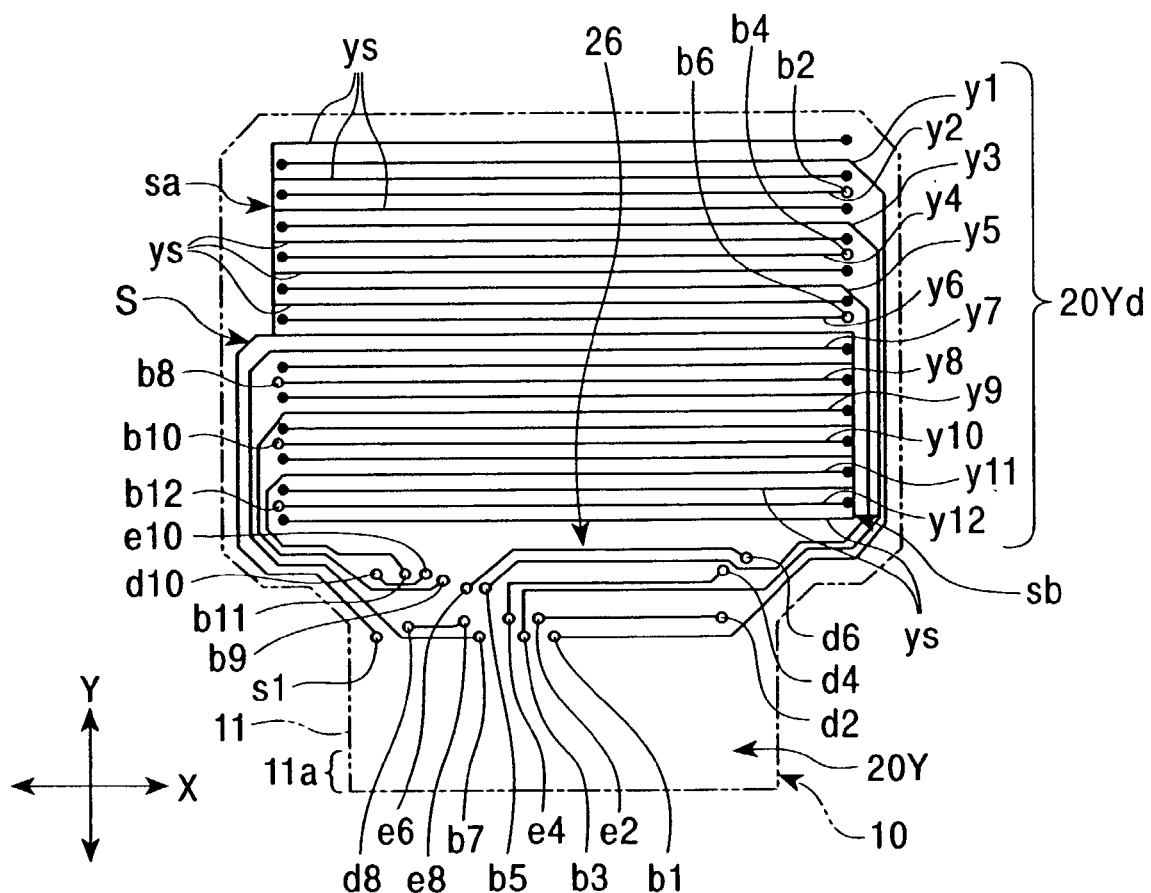
FIG. 4 is a circuit diagram of a Y electrode layer.
Figure 5:
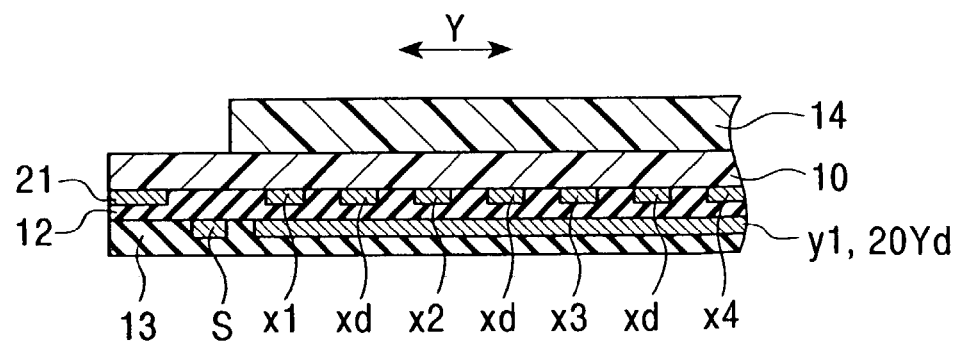
FIG. 5 is a cross-sectional view of a portion of the input device, taken along the Y direction.
Figure 6:
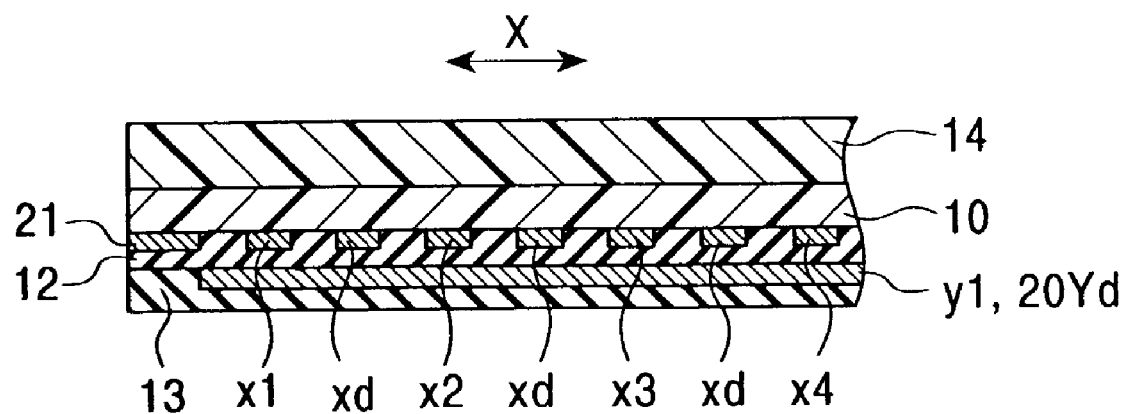
FIG. 6 is a cross-sectional view of a portion of the input device, taken along the Y direction.
Figure 7:
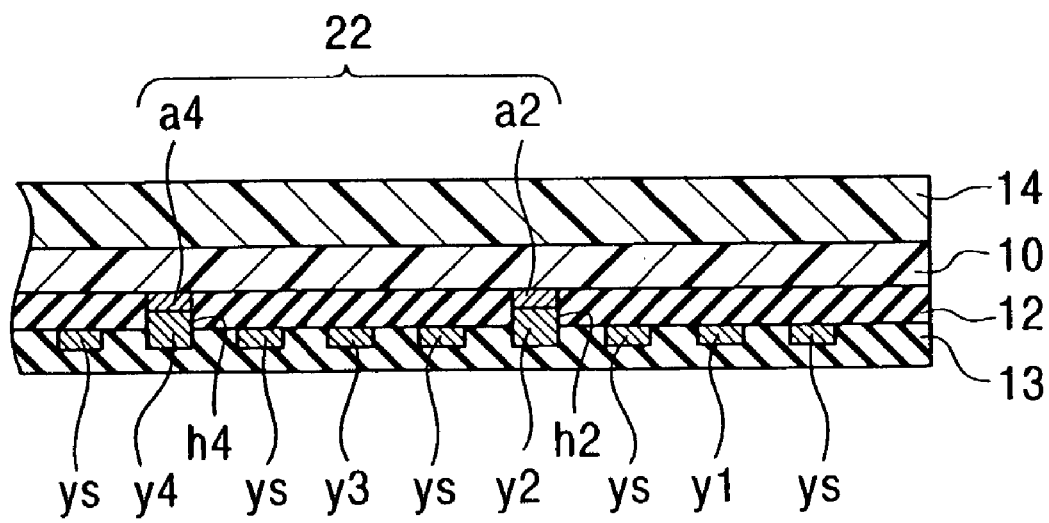
FIG. 7 is a cross-sectional view of a portion of the input device, taken along a plane passing through connections between the X electrode layer and the Y electrode layer.

FIG. 1 is an exploded perspective view of an input device 1 according to the present invention; FIG. 2 is a circuit diagram of an X electrode layer; FIG. 3 is a plan view of through-holes formed in an insulating film; FIG. 4 is a circuit diagram of a Y electrode layer; FIG. 5 is a cross-sectional view of a portion of the input device 1, taken along the Y direction; FIG. 6 is a cross-sectional view of a portion of the input device 1, taken along the Y direction; and FIG. 7 is a cross-sectional view of a portion of the input device 1, taken along a plane passing through connections between the X electrode layer and the Y electrode layer.

The input device 1 shown in FIG. 1 includes a film board 10 serving as a sensor board in the present invention. The film board 10 is formed of a sheet made of a synthetic resin having an insulating property, such as PET (polyethylene terephthalate). As shown in FIG. 1, a portion of the film board 10 extends sideward from one longer side thereof to form an extending portion 11.

An X electrode layer 20X is provided on the lower surface of the film board 10. As shown in FIG. 2, the X electrode layer 20X includes an X driving electrode array 20Xd having a plurality of (16 in this example) X electrodes x1, x2, . . . , x15, and x16 arranged in the X direction at predetermined intervals and in parallel to each other. An end of each of the X electrodes x1, x2, . . . , x15, and x16 extends to the extending portion 11.

The X electrode layer 20X formed on the film board 10 further includes a total of 15 dummy electrodes xd which are alternated with the X electrodes x1, x2, . . . , x15, and x16 so that each dummy electrode xd is formed between adjacent X electrodes. The dummy electrodes xd reduce adverse effect caused by defects on the X and Y electrode layers or external environmental problems, for example, water droplets placed on a surface of the input device 1.

A ground electrode 21 is further formed on the film board 10, in the same plane as the X driving electrode array 20Xd, so as to extend to the extending portion 11 along the periphery of the film board 10. On the film board 10, X switching electrode arrays 22, 23, and 24 each having a plurality of electrodes are formed in spaces between the X driving electrode array 20Xd and the ground electrode 21. The X driving electrode array 20Xd, the ground electrode 21, and the X switching electrode arrays 22, 23, and 24 are produced using silver paste or silver-based paste by screen printing.

For brevity, certain materials used as the various electrodes, arrays and connecters have been described. However, this is not to say that the present invention is limited to these materials. This is to say that metallic pastes and other conductive materials, including nonmetallic conductors, may be used to produce the various electrodes, arrays and conductive connecters described herein. The processes for producing and using these conductive materials are generally well known in the art.

An insulating film 12 having an insulating resin (resist) applied or printed thereon is provided over surfaces of the X driving electrode array 20Xd, the ground electrode 21, and the X switching electrode arrays 22, 23, and 24. Examples of resists used herein include polyamide resins, epoxy resins, polyurethane resins, and polyester resins. A plurality of through-holes h1, h2, . . . , h12, k2, k4, . . . , k10, m2, m4, . . . , m10, and s2 are formed in the insulating film 12, as shown in FIG. 3. The through-holes are formed so as to meet ends of the electrodes in the X switching electrode arrays 22, 23, and 24. The electrodes shown in FIG. 2 which do not correspond to the through-holes shown in FIG. 3 are test electrodes.

Referring to FIG. 4, a Y electrode layer 20Y is provided on a surface (lower surface) of the insulating film 12. The Y electrode layer 20Y includes a Y driving electrode array 20Yd having a plurality of (12 in this example) Y electrodes y1, y2, . . . , y11, and y12 arranged in a direction orthogonal to the X driving electrode array 20Xd. Some of the Y electrodes y1, y2, . . . , y11, and y12, namely, the electrodes y1, y3, y5, y7, y9, and y11, each have one end extending to some of the through-holes shown in FIG. 3 along the left and right sides (in the X direction).

A sensor electrode S is provided on the surface (lower surface) of the insulating film 12 in the same layer as the Y driving electrode array 20Yd. The sensor electrode S is formed of comb-like electrode arrays sa and sb each having electrodes ys. The electrodes ys in the comb-like electrode arrays sa and sb are interleaved with the Y electrodes y1, y2, . . . , y11, and y12. The comb-like electrode array sa is horizontally reversed with respect to the comb-like electrode array sb in such a manner that the tip of the comb-like electrode array sa opposes the tip of the comb-like electrode array sb. The comb-like electrode arrays sa and sb are combined into a single electrode at the center in the Y direction, extending to the through-hole shown in FIG. 3.

In FIG. 2, the electrodes in the X electrode layer 20X are indicated by outlined thick lines, while, in FIG. 4, the electrodes in the Y electrode layer 20Y are indicated by thin solid lines. However, both electrode arrays are formed of electrodes having substantially the same width.

As shown in FIG. 1, an insulating film 13, similar to the insulating film 12, which is made of an insulating resin is formed over a surface including the Y driving electrode array 20Yd by printing. A top sheet 14, which is touched by a finger of a user or a pen operated by a user (in other words contactable by a user), is secured to the upper surface of the film board 10 by an adhesive or the like.

When the X electrode layer 20X and the Y electrode layer 20Y are formed on one side of the film board 10 in the aforementioned manner, the electrodes in the Y electrode layer 20Y must be led to the plane in which the X electrode layer 20X is formed. A formation process for electrodes in the illustrated embodiment is now described with reference to FIGS. 2 to 4.

In the Y electrode layer 20Y, the Y electrodes y1, y3, y5, y7, y9, and y11 extend to contacts b1, b3, b5, b7, b9, and b11, respectively. The Y electrodes y1, y3, y5, y7, y9, and y11 are connected to contacts a1, a3, a5, a7, a9, and all provided for the X switching electrode array 24 via the through-holes h1, h3, h5, h7, h9, and h11, respectively.

Contacts b2, b4, b6, b8, b10, and b12 at the ends of the Y electrodes y2, y4, y6, y8, y10, and y12 are connected to contacts a2, a4, and a6 at the electrode ends of the X switching electrode array 22, and contacts a8, a10, and a12 at the electrode ends of the X switching electrode array 23 via the through-holes h2, h4, h6, h8, h10, and h12 formed in the insulating film 12, respectively. Only the electrode provided with the contact a12 extends to the edge of the extending portion 11. The X switching electrode array 22 is provided with contacts c2, c4, and c6 at the electrode ends opposite to the contacts a2, a4, and a6. The X switching electrode array 23 is provided with contacts c8 and c10 at the electrode ends opposite to the contacts a8 and a10. The contacts c2, c4, c6, c8, and c10 are connected to contacts d2, d4, d6, d8, and d10 provided for electrode ends of a Y switching electrode array 26 via the through-holes k2, k4, k6, k8, and k10 formed in the insulating film 12, respectively. The Y switching electrode array 26 is further provided with contacts e2, e4, e6, e8, and e10 at the electrode ends opposite to the contacts d2, d4, d6, d8, and d10. The contacts e2, e4, e6, e8, and e10 are connected to contacts f2, f4, f6, f8, and f10 provided for the X switching electrode array 24 via the through-holes m2, m4, m6, m8, and m10 formed in the insulating film 12, respectively. Thus, the Y electrodes y2, y4, y6, y8, y10, and y12 are led from the Y electrode layer 20Y onto the same plane as the X electrode layer 20X.

A contact s1 extending from the sensor electrode S formed in the Y electrode layer 20Y is connected to a contact s3 for the X switching electrode array 24 via the through-hole s2 formed in the insulating film 12.

The thus configured circuit allows all of the electrodes in the X electrode layer 20X and the Y electrode layer 20Y to be gathered to an edge portion Ds of the extending portion 11 on the film board 10.

Referring to FIG. 5, in the input device 1, the film board 10 is placed so as to project from the left and right sides of the top sheet 14 in the Y direction. Further referring to FIG. 6, one longer side of the top sheet 14 is aligned with the longer side of the film board 10. Therefore, the left and right sides of the film board 10, and the extending portion 11 project with respect to the top sheet 14 when the input device 1 is viewed from above the top sheet 14.

At the connections between the X electrode layer 20X and the Y electrode layer 20Y via the through-holes, as shown in FIG. 7, silver or silver-based paste is filled in the through-holes h2, h4, etc., in the insulating film 12 when the Y electrodes y2, y4, etc., are printed, thereby providing electrical connection with the contacts a2, a4, etc., for the X switching electrode array 22. On the other hand, the Y electrodes y1, y3, etc., pass across the surface of the insulating film 12, and are connected to the X switching electrode array 24 in the X electrode layer 20X via the through-holes h1, h3, etc. . . .

In this way, the circuit patterns of the Y electrodes y1, y2, . . . , y11, and y12 are separately formed on the upper and lower surfaces of the insulating film 12, thus making the pitch between electrodes narrower. If the electrodes on the upper surface of the insulating film 12 overlap the electrodes on the lower surface of the insulating film 12, there is no electrical connection therebetween. Therefore, the portions of the film board 10 which project beyond the top sheet 14 can be reduced in dimension. Thus, the overall input device 1 can be compact.

As shown in FIG. 2, in the input device 1 in the illustrated embodiment, the leading ends (hereinafter referred to as "Ds ends") of all electrodes in the X electrode layer 20X and all electrodes in the Y electrode layer 20Y are introduced to the edge portion Ds of the extending portion 11 provided for the film board 10. The dimension by which the extending portion 11 projects (L1+L2) is greater than the dimension by which the insulating films 12 and 13 project so as to overlap the extending portion 11 (L2). Thus, when the insulating films 12 and 13 are placed on the film board 10, the Ds ends of electrodes in the X and Y electrode layers 20X and 20Y formed on the film board 10 are exposed on the surface (lower surface) of the film board 10 (see FIG. 1).

The Ds ends of electrodes in the X electrode layer 20X and the Y electrode layer 20Y are connected to a conductor portion 5 formed on the control circuit substrate 4. The control circuit substrate 4 is much smaller than the film control circuit 8, etc., mounted on the board 4a. The land portions 5a2 and 7a2 serve as test circuits.

Figure 8:
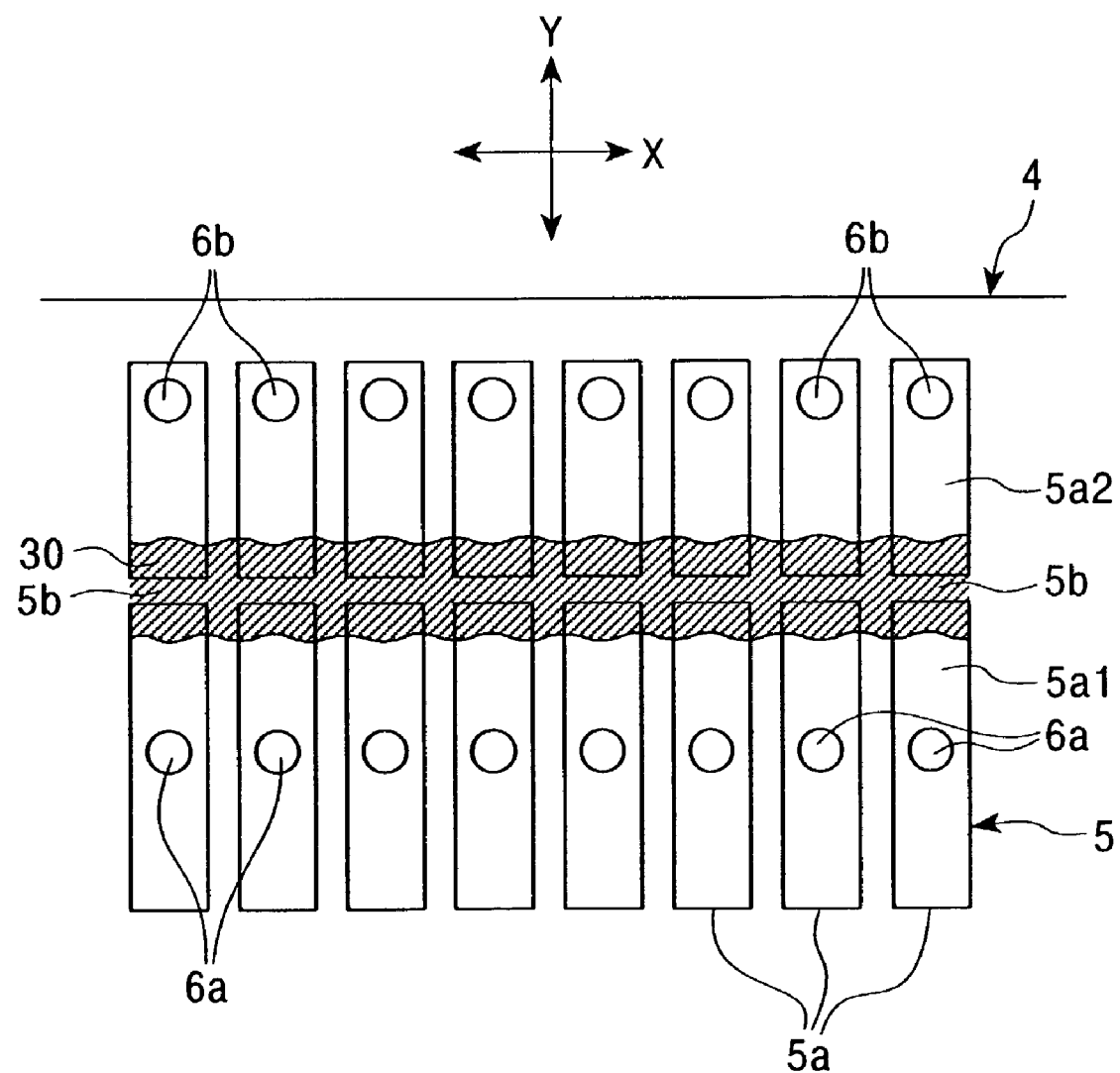
FIG. 8 is a plan view of a conductor portion formed on a control circuit substrate.

As shown in FIG. 8, in the input device 1 in the illustrated embodiment, the Ds ends of electrode in the electrode layers 20X and 20Y are bonded to the control circuit substrate 4 by applying a thermosetting adhesive 30 (depicted as hatched in FIG. 8) in a line to the gaps 5b formed in the conductor portion 5. The adhesive 30 is made of an insulating fluid material, such as an epoxy resin, which contains no conductive particles.

Figure 9:
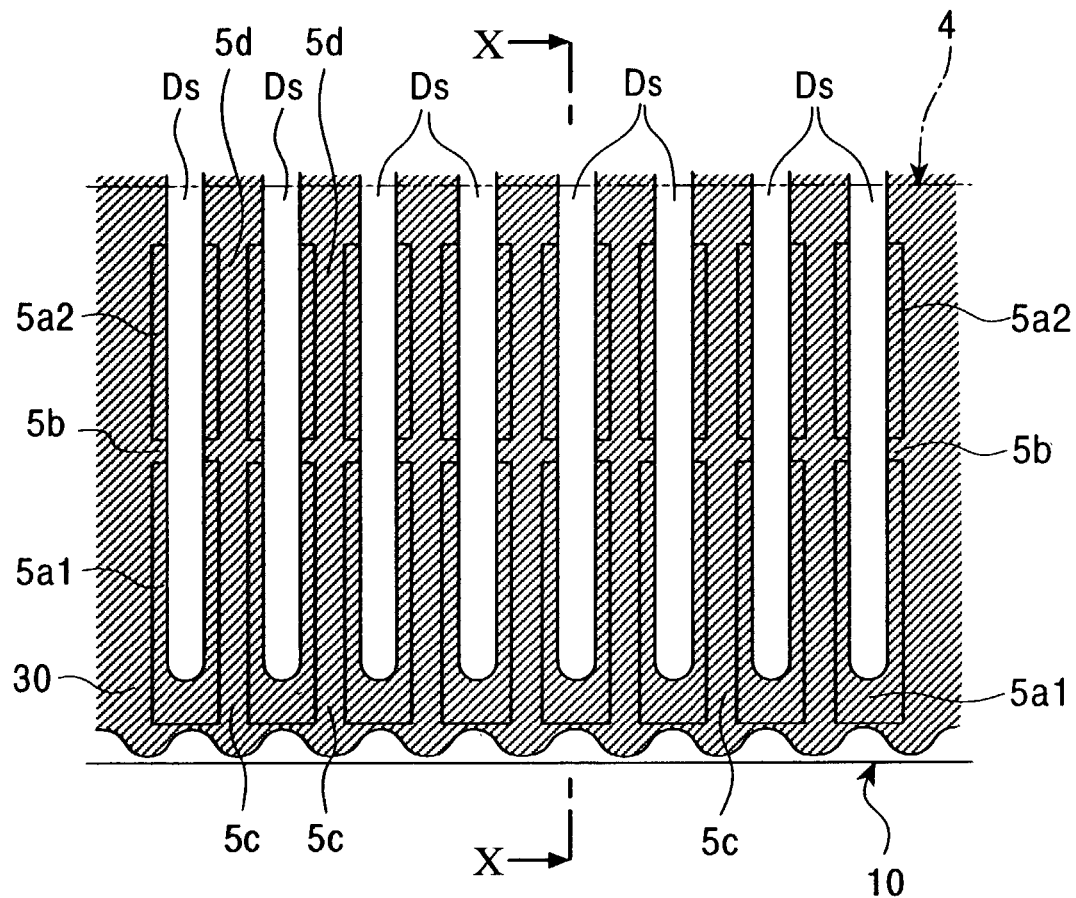
FIG. 9 is a plan view showing that the control circuit substrate and the electrode layers are bonded to each other.
Figure 10:
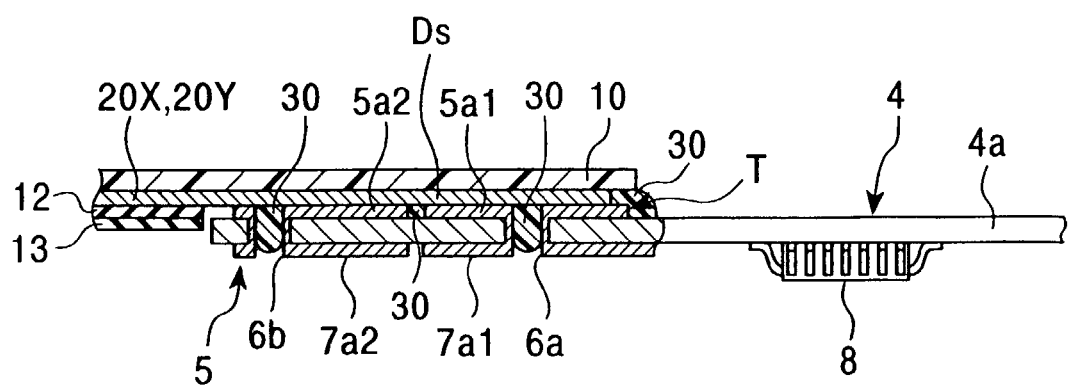
FIG. 10 is a cross-sectional view of the bonded product, taken along a line X—X of FIG. 9.
Figure 11:
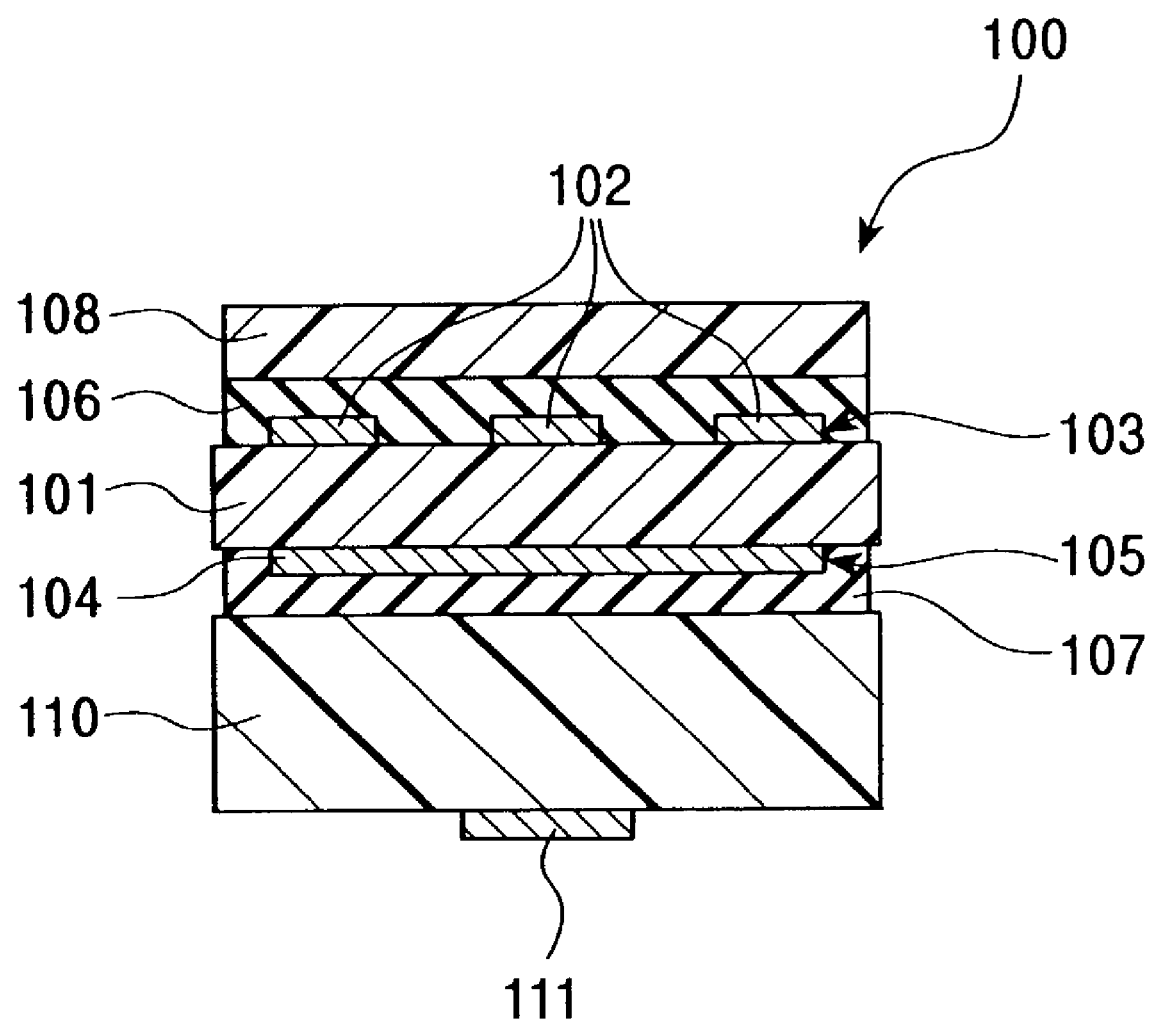
FIG. 11 is a schematic cross-sectional view of an input device in the related art.

After the adhesive 30 is applied in a line to a region including the gaps 5b, the Ds ends are positioned with respect to the conductor portion 5, which are then heated and pressurized. The Ds ends are thus bonded to the control circuit substrate 4. FIG. 9 illustrates the bonded product, and FIG. 10 is a cross-sectional view of the product, taken along a line X—X of FIG. 9. When the adhesive 30 is heated and pressurized, the adhesive 30 expands out of the gaps 5b into spaces 5c between the land portions 5a1 and spaces 5d between the land portions 5a2, and therefore into the surrounding. The adhesive 30 expands and enters the spaces 5c and 5d, thus ensuring that the film board 10 is bonded to the control circuit substrate 4. The pressurization allows the adhesive 30 to be substantially eliminated from bonding surfaces T between the electrodes in the edge portion Ds and the land portions 5a1 and 5a2 of the conductor portion 5. Thus, the Ds ends of electrodes in the X and Y electrode layers 20X and 20Y can be directly and electrically connected to the conductor portion 5, as shown in FIG. 10. In addition, as shown in FIG. 10, the Ds ends of electrodes in the X and Y electrode layers 20X and 20Y are disposed on the same plane on the extending portion 11 of the sensor board 10 and the insulating films 12 and 13 are not present between the conductor portion 5 of the control board 4 and the Ds ends of electrodes in the X and Y electrode layers 20X and 20Y, thereby decreasing the thickness of the composite.

The adhesive 30 applied to the surfaces of the land portions 5a1 and 5a2 also enters the holes 6a and 6b from the surfaces of the land portions 5a1 and 5a2. The adhesive 30 substantially fills in the holes 6a and 6b and is hardened therein, thereby increasing the bonding intensity between the control circuit substrate 4 and the edge portion Ds. A dummy conductor may be provided in the vicinity of the conductor portion 5 on the control circuit substrate 4, and a dummy electrode may also be provided on the film board 10 so as to overlap the dummy conductor, thus further increasing the bonding intensity.

In the input device 1 in the illustrated embodiment, touch is sensed by the X driving electrode array 20Xd, the Y driving electrode 20Yd, and the sensor electrode S.

Specifically, when a conductor such as a human finger touches the top sheet 14 in the state where an electric field having a predetermined potential is applied between the X driving electrode array 20Xd (the X electrodes x1 to x16) and the Y driving electrode array 20Yd (the Y electrodes y1 to y12), capacitance between the X driving electrode array 20Xd and the Y driving electrode array 20Yd varies at the location which the conductor touches.

In order to obtain X-coordinate data, the X driving electrode array 20Xd is selected every two X electrodes to obtain a detection output corresponding to a variation of capacitance between the X driving electrode array 20Xd and the sensor electrode S. Likewise, in order to obtain Y-coordinate data, the Y driving electrode array 20Yd is selected every two Y electrodes to obtain a detection output corresponding to a variation of capacitance between the Y driving electrode array 20Yd and the sensor electrode S. The X and Y electrode layers are disposed proximate to each other. Proximate to each other in this case means that the X and Y electrode layers are disposed close enough together to permit this variation in capacitance to be detected using conventional detection techniques that detect the change of capacitance in existing capacitive input sensors, for example. The detection outputs from all electrodes in the X driving electrode array 20Xd and the detection outputs from all electrodes in the Y driving electrode array 20Yd are alternately obtained in a time-division manner.

The thus obtained detection outputs are amplified by an amplifier, and are converted into digital signals by an analog-to-digital (A/D) converter. A control unit performs a predetermined calculation on the digital signals, and sends the resulting signals to a personal computer (PC), where the signals are controlled according to the calculation result.

What is claimed is:

1. An input device comprising a sensor board, an X electrode layer having electrodes, a Y electrode layer having electrodes, and
an insulating film disposed between the X and Y electrode; and
a control circuit board,
wherein the X and Y electrode layers are disposed proximate to each other and on one surface side of the sensor board, and the sensor board and the control circuit board bonded to each other by a heated, pressurized thermosetting adhesive such that ends of the electrodes in the X and Y electrode layers on the sensor board contact a conductor portion on the control circuit board.

2. An input device according to claim 1, wherein through-holes are formed in the insulating film;

ends of the electrodes in one of the X electrode layer and the Y electrode layer are led through the through-holes onto the same plane as ends of the electrodes in the other layer; and the ends of the electrodes in the X and Y electrode layers oppose and are directly connected to the conductor portion on the control circuit board.

3. An input device according to claim 2, wherein the through-holes correspond to portions of one of the X electrode layer and the Y electrode layer.

4. An input device according to claim 1, wherein the sensor board comprises a film board.

5. An input device according to claim 1, wherein a hole is formed in the conductor portion, that passes through the control circuit board, the hole is connected to the conductor portion, and the adhesive substantially fills the hole.

6. An input device according to claim 1, wherein the sensor board and the insulating film have outwardly extending portions that project in a direction of the plane of the sensor board and the insulating film, respectively, the extending portion of the sensor board extending further than and overlapping the extending portion of the insulating film.

7. An input device according to claim 6, wherein ends of the electrodes in the X and Y electrode layers are disposed on the extending portion of the sensor board, the ends of the electrodes in the X and Y electrode layers disposed on the same plane.

8. An input device according to claim 7, wherein the ends of the electrodes in the X and Y electrode layers oppose and are directly connected to a conductor portion on a control circuit board.

9. An input device according to claim 7, wherein through-holes are formed in the insulating film and the ends of the electrodes in one of the X electrode layer and the Y electrode layer are led through the through-holes onto the same plane of the sensor board.

10. An input device according to claim 9, wherein the through-holes correspond to portions of one of the X electrode layer and the Y electrode layer.

11. An input device according to claim 7, wherein the sensor board and the control circuit board are bonded to each other by an adhesive, and substantially no adhesive is present between the ends of the electrodes in the X and Y electrode layers on the sensor board and the conductor portion on the control circuit board.

12. An input device according to claim 11, wherein a hole is formed in the conductor portion that passes through the control circuit board, the hole is connected to the conductor portion, and the adhesive substantially fills the hole.

13. An input device according to claim 1, the insulating film being a first insulating film, further comprising a second insulating film opposing the first insulating film with one of the X and Y electrode layers disposed therebetween.

14. An input device according to claim 1, further comprising a top sheet disposed on the sensor board, the top sheet contactable by a user.

15. An input device according to claim 1, wherein the conductor portion comprises a planar array of land portions separated by gaps, the adhesive disposed in the gaps.

16. An input device comprising:
a sensor board;
an X electrode layer having electrodes;
a Y electrode layer having electrodes, the X electrode and Y electrode layers disposed proximate to each other; and
an insulating film disposed between the X and Y electrode layers and
a control circuit board bonded to the sensor board by an adhesive, such that substantially no adhesive is present between end portions of the electrodes in the X and Y electrode layers on the sensor board and the conductor portion on the control circuit board,
wherein ends of the electrodes in the X and Y electrode layers are disposed on the same plane of the sensor board.

17. An input device according to claim 16, wherein the sensor board and the insulating film have extending portions that project in a direction of the plane of the sensor board and the insulating film, respectively, the extending portion of the sensor board extending further than and overlapping the extending portion of the insulating film, the ends of the electrodes in the X and Y electrode layers disposed on the extending portion of the sensor board.

18. An input device according to claim 17, wherein the ends of the electrodes in the X and Y electrode layers oppose and directly connect to the conductor portion.

19. An input device according to claim 18, further comprising through-holes formed in the insulating film, the ends of the electrodes in one of the X electrode layer and the Y electrode layer led through the through-holes onto the extending portion of the sensor board.

20. An input device according to claim 19, wherein the through-holes correspond to portions of one of the X electrode layer and the Y electrode layer.

21. An input device according to claim 18, wherein a hole is formed in the conductor portion that passes through the control circuit board, the hole is connected to the conductor portion, and the adhesive substantially fills the hole.

22. An input device according to claim 21, wherein the conductor portion comprises a planar array of land portions separated by gaps and the adhesive is disposed in the gaps.

23. An input device according to claim 16, further comprising a top sheet disposed on the sensor board, the top sheet contactable by a user.

24. An input device according to claim 16, wherein an entirety of the X and Y electrode layers are disposed on the same side of the sensor board.

25. A method comprising:
separating X and Y electrode layers of a capacitive input device by an insulating film such that the X and Y electrode layers are disposed proximate to each other;
combining ends of electrodes in the X and Y electrode layers on the same plane of a sensor board;
directly connecting a conductor portion of a control circuit board to the ends of the electrodes in the X and Y electrode layers; and
bonding the sensor board and the control circuit board using adhesive disposed in gaps separating a planar array of land portions that form the conductor portion.

26. A method according to claim 25, further comprising extending a portion of the sensor board and the insulating film in parallel directions, the extending portion of the sensor board extending further than the extending portion of the insulating film and combining the ends of the electrodes in the X and Y electrode layers on the extending portion of the sensor board.

27. A method according to claim 25, further comprising guiding the ends of the electrodes in one of the X electrode layer and the Y electrode layer through through-holes to merge the ends of electrodes in the X and Y electrode layers on the same plane of the sensor board.

28. A method according to claim 25, further comprising substantially eliminating adhesive from between the ends of the electrodes in the X and Y electrode layers on the sensor board and the conductor portion on the control circuit board.

29. A method according to claim 27, further comprising substantially filling a hole formed in the conductor portion, and that passes through the control circuit board, with the adhesive.

30. A method according to claim 29, wherein the adhesive is a thermosetting adhesive, the method further comprising heating and pressurizing the thermosetting adhesive to bond the sensor board and the control circuit board to each other.

31. A method according to claim 25, further comprising placing a top sheet on the sensor board such that when the top sheet is contacted by a user, a variation in capacitance between the electrodes in the X and Y electrode layers is detectable.

* * * * *